(12) United States Patent
Zhu et al.

(10) Patent No.: US 9,686,553 B2
(45) Date of Patent: Jun. 20, 2017

(54) ADVANCED VIDEO CODING AND DECODING CHIP AND ADVANCED VIDEO CODING AND DECODING METHOD

(71) Applicant: VIA Alliance Semiconductor Co., Ltd., Shanghai (CN)

(72) Inventors: ChuanChuan Zhu, Shanghai (CN); Jialiang Liu, Shanghai (CN); Zixi Wang, Shanghai (CN); Jin Shao, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 362 days.

(21) Appl. No.: 14/640,129

(22) Filed: Mar. 6, 2015

(65) Prior Publication Data
US 2016/0173876 A1    Jun. 16, 2016

(30) Foreign Application Priority Data

Dec. 11, 2014    (CN) .......................... 2014 1 0765102

(51) Int. Cl.
| | |
|---|---|
| *H04N 7/12* | (2006.01) |
| *H04N 19/124* | (2014.01) |
| *H04N 19/176* | (2014.01) |
| *H04N 19/129* | (2014.01) |
| *H04N 19/61* | (2014.01) |
| *H04N 19/593* | (2014.01) |
| *H04N 19/436* | (2014.01) |
| *H04N 19/625* | (2014.01) |

(52) U.S. Cl.
CPC ......... *H04N 19/124* (2014.11); *H04N 19/129* (2014.11); *H04N 19/176* (2014.11); *H04N 19/436* (2014.11); *H04N 19/593* (2014.11); *H04N 19/61* (2014.11); *H04N 19/625* (2014.11)

(58) Field of Classification Search
CPC .............................. H04N 19/124; H04N 19/45
USPC ............................ 375/240.03, 240.18, 240.2
See application file for complete search history.

(56) References Cited

U.S. PATENT DOCUMENTS

| | | | |
|---|---|---|---|
| 2006/0222066 A1 | 10/2006 | Yoo et al. | |
| 2011/0058606 A1 | 3/2011 | Dencher | |
| (Continued) | | | |

FOREIGN PATENT DOCUMENTS

| | | |
|---|---|---|
| CN | 103763561 | 4/2014 |
| JP | 2008-182527 | 8/2008 |
| JP | 2008-271127 | 11/2008 |
| (Continued) | | |

OTHER PUBLICATIONS

European Search Report dated Apr. 29, 2016, issued in application No. 15188996.1-1905.

(Continued)

*Primary Examiner* — Farzana Hossain
(74) *Attorney, Agent, or Firm* — McClure, Qualey & Rodack, LLP (57) ABSTRACT

An advanced video coding and decoding chip and a method with an optimized processing sequence for the sub-blocks, each including 4×4 pixels, of a macroblock in a discrete cosine transform (DCT) and an inverse DCT are disclosed, wherein the compression hardware and the reconstruction hardware execute the compression and the reconstruction of at least part of a field in parallel.

16 Claims, 4 Drawing Sheets

(56) References Cited

U.S. PATENT DOCUMENTS

2011/0157190 A1 6/2011 Tsai et al.
2015/0181237 A1* 6/2015 Tsukuba ................ H04N 19/44
                                                    382/233

FOREIGN PATENT DOCUMENTS

TW    201123084    7/2011
TW    201227351    7/2012

OTHER PUBLICATIONS

Ren, H., et al., "A 16-pixel parallel architecture with block-level/Mode-level Co-reordering Approach for Intra Prediction in 4kx2k H.264/AVC Video Encoder;" IEEE; Jan. 2012; pp. 801-806.
Lee, W., et al.; "Pipelined Intra Prediction Using Shuffled Encoding Order for H.264/AVC;" IEEE; Nov. 2006; pp. 1-4.
H.264—Series H: Audiovisual and Multimedia Systems—Infrastructure of audiovisual services—Coding of moving video—Advanced video coding for generic audiovisual services; Mar. 2005; pp. 1-332.

* cited by examiner

ADVANCED VIDEO CODING AND DECODING CHIP AND ADVANCED VIDEO CODING AND DECODING METHOD

CROSS REFERENCE TO RELATED APPLICATIONS

This application claims priority of China Patent Application No. 201410765102.2, filed on Dec. 11, 2014, the entirety of which is incorporated by reference herein.

BACKGROUND OF THE INVENTION

Field of the Invention

The present invention relates to an advanced video coding and decoding chip and method, and it particularly relates to H.264 high-resolution video recording, compression, and release.

Description of the Related Art

H.264, introduced in part 10 of MPEG-4, is an advanced video format and is mature in the use of video compression and codecs, and is gradually being used widely in many applications like those for videoconferencing, video surveillance, consumer electronics, and so on that demand high-resolution and real-time video coding. Therefore, how to optimize H.264 encoder hardware to achieve high-resolution and real-time video transmission is a popular topic.

BRIEF SUMMARY OF THE INVENTION

Advanced video coding and decoding technology with coding speed optimization is disclosed, which dramatically improves the coding speed of H.264 encoder hardware.

An advanced video coding and decoding chip in accordance with an exemplary embodiment of the disclosure comprises discrete cosine transform (DCT) hardware and inverse DCT hardware. The DCT hardware performs DCT on residual values of a transformation advanced sub-block before performing DCT on residual values of a transformation overtaken sub-block. The transformation advanced sub-block is one of the sub-blocks, numbered from 0 to 15, of a macroblock and the transformation overtaken sub-block is one of the sub-blocks numbered lower than the transformation advanced sub-block within the macroblock. The inverse DCT hardware performs inverse DCT on inverse-quantized transform coefficients of the transformation advanced sub-block before performing inverse DCT on inverse-quantized transform coefficients of the transformation overtaken sub-block. Furthermore, the DCT hardware performs DCT on residual values of the transformation advanced sub-block and the inverse DCT hardware performs inverse DCT on inverse-quantized transform coefficients of a parallel executed sub-block in parallel. The parallel executed sub-block is one of the sub-blocks numbered lower than the transformation advanced sub-block within the macroblock.

An advanced video coding and decoding method in accordance with an exemplary embodiment of the disclosure comprises: using discrete cosine transform (DCT) hardware to perform DCT on residual values of a transformation advanced sub-block before performing DCT on residual values of a transformation overtaken sub-block, wherein the transformation advanced sub-block is one of the sub-blocks, numbered from 0 to 15, of a macroblock, and the transformation overtaken sub-block is one of the sub-blocks numbered lower than the transformation advanced sub-block within the macroblock; using inverse DCT hardware to perform inverse DCT on inverse-quantized transform coefficients of the transformation advanced sub-block before performing inverse DCT on inverse-quantized transform coefficients of the transformation overtaken sub-block; and, using the DCT hardware to perform DCT on residual values of the transformation advanced sub-block when using the inverse DCT hardware to perform inverse DCT on inverse-quantized transform coefficients of a parallel executed sub-block, wherein the parallel executed sub-block is one of the sub-blocks numbered lower than the transformation advanced sub-block within the macroblock.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of several exemplary embodiments carrying out the invention. This description is made for the purpose of illustrating the general principles of the invention and should not be taken in a limiting sense. The scope of the invention is best determined by reference to the appended claims.

Figure 1:
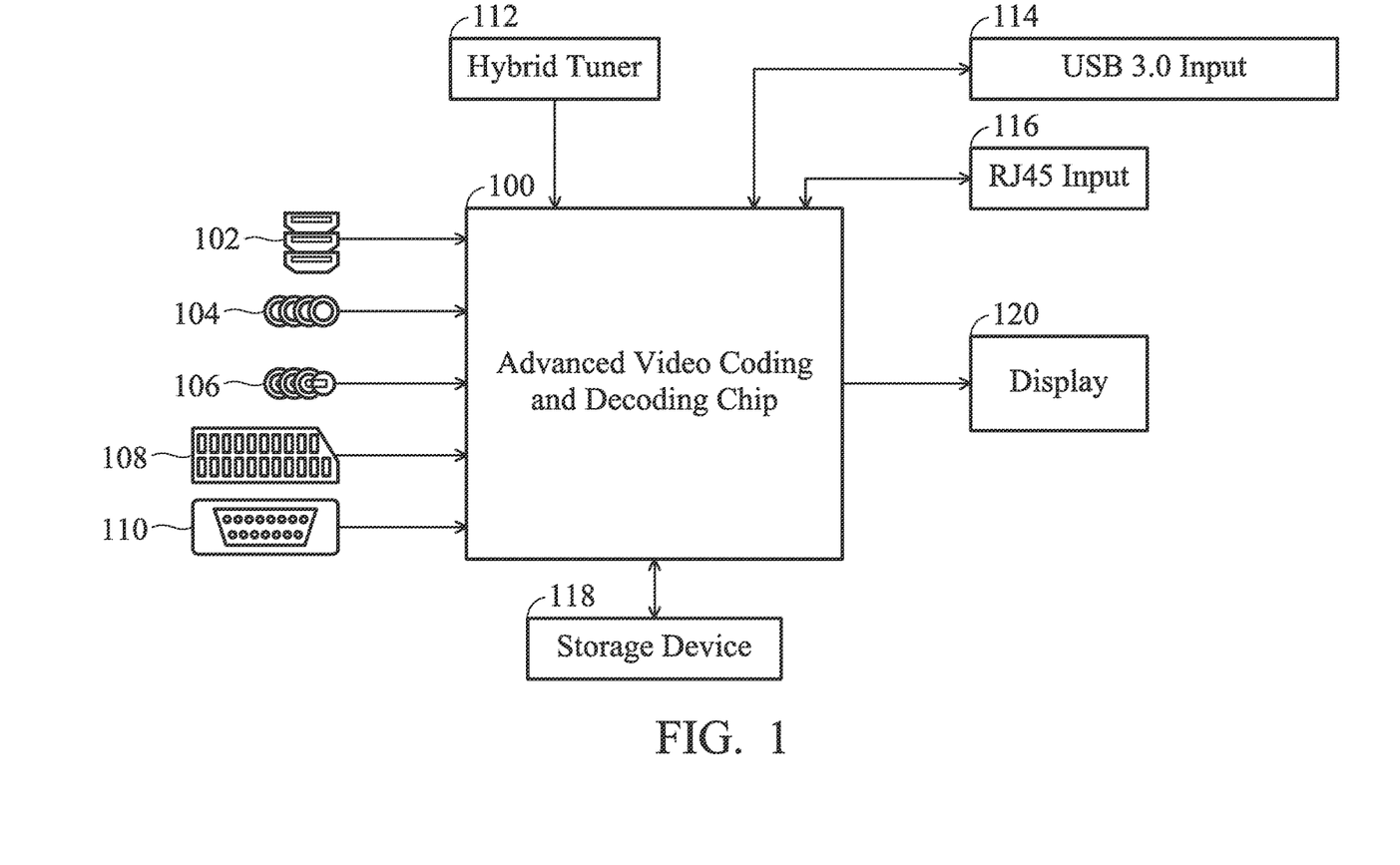
FIG. 1 depicts how an advanced video coding and decoding chip 100 is used in different applications.

FIG. 1 depicts how an advanced video coding and decoding chip 100 is used in different applications. The advanced video coding and decoding chip 100 may be fabricated by a system-on-chip (SOC) technology for advanced video coding and decoding like H.264. The advanced video coding and decoding chip 100 may retrieve video data from a high-definition multimedia interface (HDMI) 102, a YPbPr input 104, a multiple CVBS input 106, an SCART input 108, an RGB input 110, a hybrid tuner 112, an USB 3.0 input 114, an RJ45 input 116 and so on, and stores the encoded and compressed video into a storage device 118. The advanced video coding and decoding chip 100 may further recover a high-definition video from the compressed video, and the high-definition video is displayed on the display 120.

Figure 2:
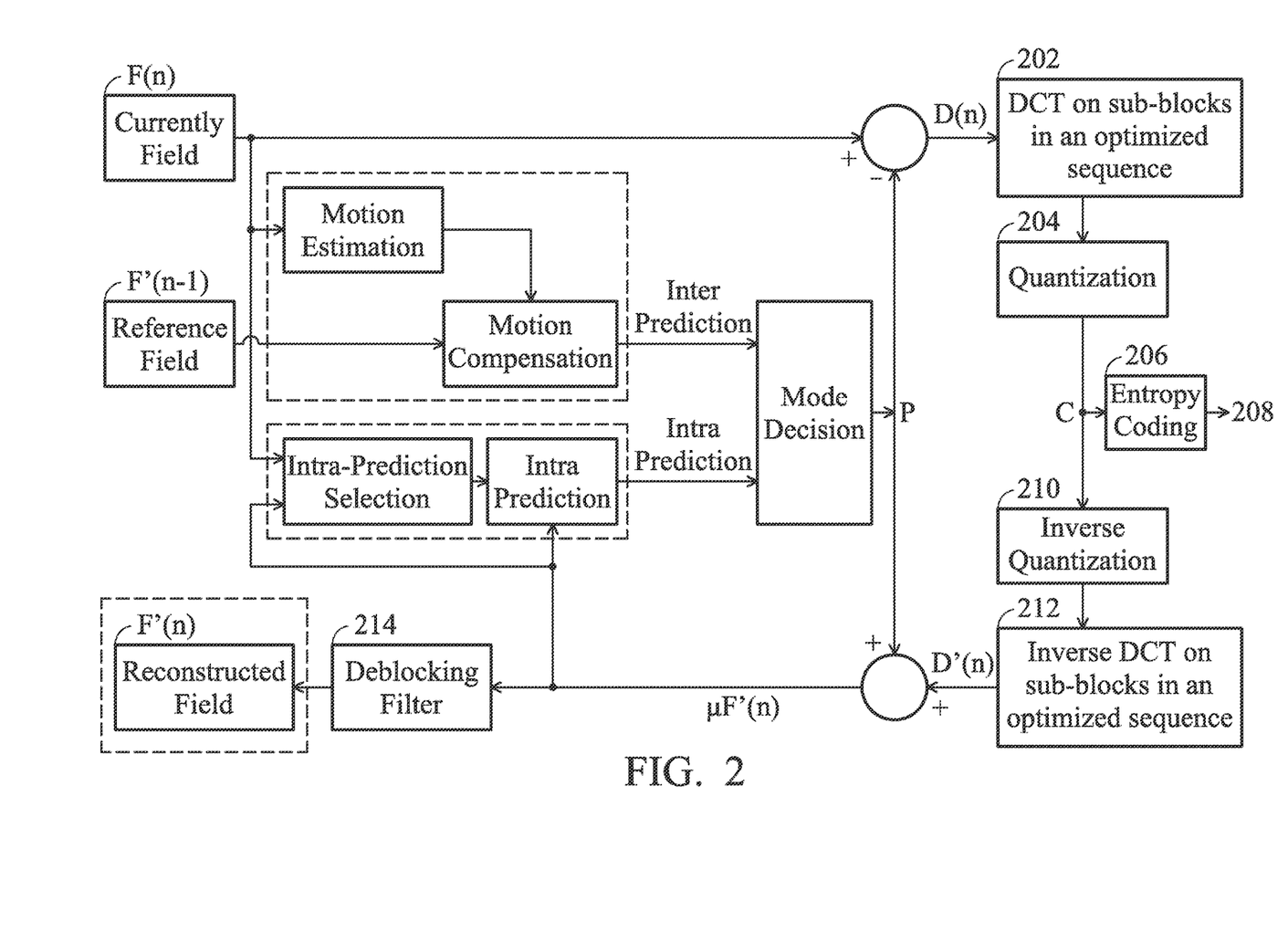
FIG. 2 is a block diagram depicting the internal hardware of the advanced video coding and decoding chip 100 in accordance with an exemplary embodiment of the disclosure.

FIG. 2 is a block diagram depicting the internal hardware of the advanced video coding and decoding chip 100 in accordance with an exemplary embodiment of the disclosure. A macroblock with 16×16 pixels and containing 16 sub-blocks each having 4×4 pixels is introduced as an encoding unit. There are two types of coding algorithms: intra prediction coding; and inter prediction coding. The intra prediction coding generates predicted pixels P from the pixels within the current field F(n). As for the inter prediction coding, a reconstructed field F'(n−1), also known as a reference field, of the previous field is also taken into account to generate the predicted pixels P. Residual values D(n) are calculated from the difference between the predicted pixels P and the current field F(n). The residual values D(n) are transformed into transform coefficients C by DCT hardware 202 and quantization hardware 204. The DCT hardware 202 processes the sub-blocks within a macroblock in an optimized sequence. Then, the transform coefficients C are transformed into an advanced video coding stream 208 by entropy coding hardware 206. Furthermore, the transform coefficients C are further converted by inverse quantization hardware 210 and inverse DCT hardware 212 to generate reconstructed residual values D'(n). The inverse DCT hardware 212 also processes the sub-blocks within the macroblock in the optimized sequence. The residual values D'(n) are added back to the predicted pixels P to form reconstructed pixels µF(n). The reconstructed pixels µF'(n) are processed by deblocking filter hardware 214 and thereby a reconstructed field F'(n) is reconstructed as a reference field for the next coding field.

Figure 3:
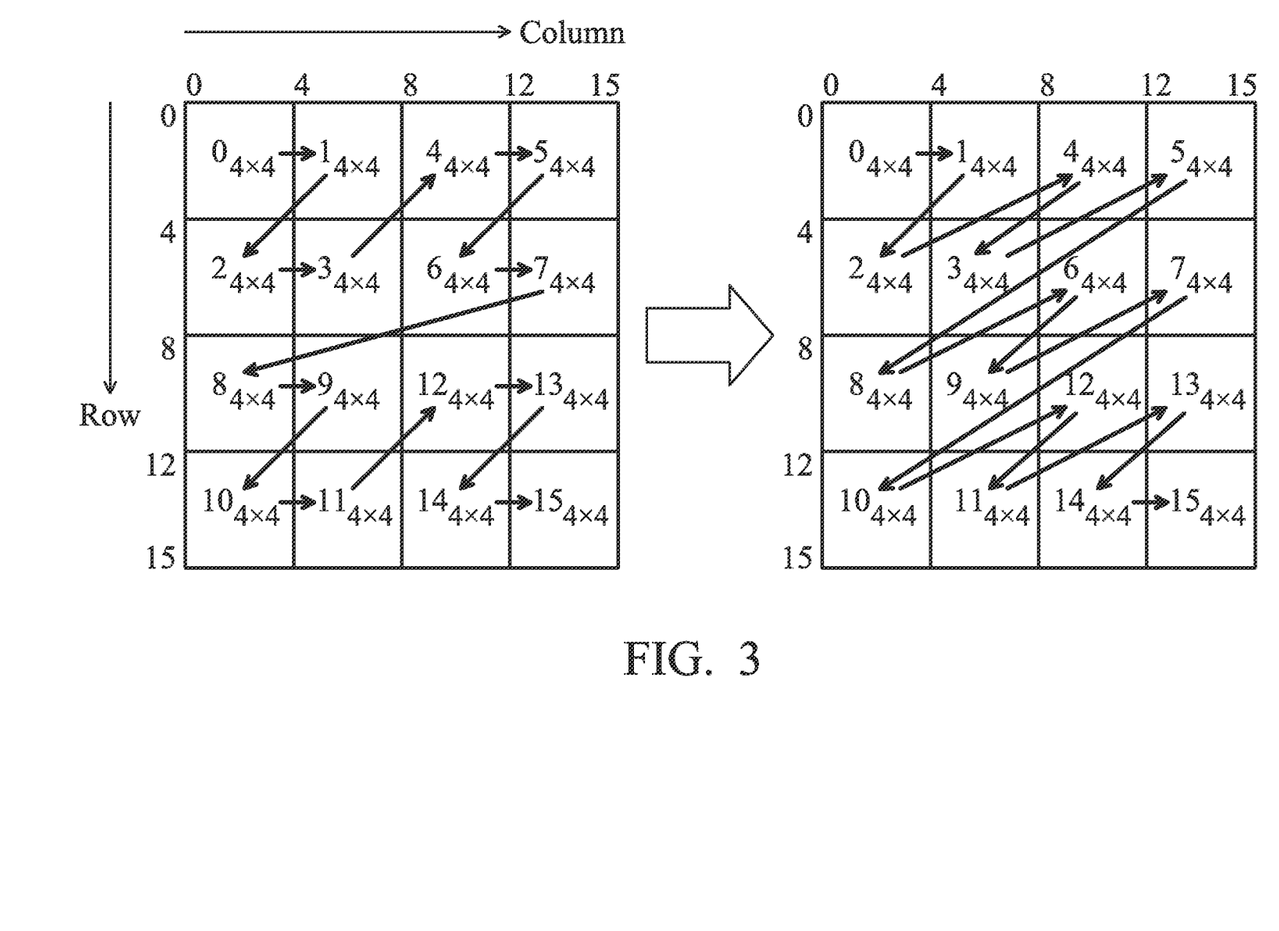
FIG. 3 includes a left picture illustrating a conventional sequence for processing sub-blocks within a macroblock, and a right picture illustrating an optimized sequence for performing DCT and inverse DCT on the sub-blocks in accordance with an exemplary embodiment of the disclosure.

As mentioned above, the DCT hardware 202 and the inverse DCT hardware 212 of FIG. 2 process the sub-blocks within a macroblock in an optimized sequence. The DCT hardware 202 operated in accordance with the optimized sequence is about a "transformation" scheme while the inverse DCT hardware 212 operated in accordance with the optimized sequence is about a "reconstruction" scheme. With respect to the optimized sequence that the hardware 202 and 204 process the sub-blocks in one macroblock, the quantization (performed by hardware 204 and 210) of the sub-blocks in the macroblock may be operated in the same optimized sequence. FIG. 3 illustrates an optimized sequence of processing sub-blocks within a macroblock for DCT (about the "transformation" scheme) and inverse DCT (about the "reconstruction" scheme) in the right picture in accordance with an exemplary embodiment of the disclosure. In the left picture of FIG. 3, a conventional sequence of processing sub-blocks within a macroblock for DCT and inverse DCT is illustrated. The 16 sub-blocks (each having 4×4 pixels) are further divided into an upper left part (containing the sub-blocks numbered from 0 to 3 and arranged in the upper left side, upper right side, lower left side and lower right side of the upper left part in order), an upper right part (containing the sub-blocks numbered from 4 to 7 and arranged in the upper left side, upper right side, lower left side and lower right side of the upper right part in order), a lower left part (containing the sub-blocks numbered from 8 to 11 and arranged in the upper left side, upper right side, lower left side and lower right side of the lower left part in order), and a lower right part (containing the sub-blocks numbered from 12 to 15 and arranged in the upper left side, upper right side, lower left side and lower right side of the lower right part in order). Referring to the left picture of FIG. 3, the conventional sequence from the number 0 sub-block to the number 15 sub-block in order is for DCT (about the "transformation" scheme) and inverse DCT (about the "reconstruction" scheme) on the sub-blocks within a macroblock. Referring to the right picture of FIG. 3, the optimized sequence is:

0→1→2→4→3→5→8→6→9→7→10→
12→11→13→14→15, which is different from the conventional sequence from the number 0 sub-block to the number 15 sub-block in order. The underlined numbers are the difference between the optimized sequence and the conventional sequence. According to the optimized sequence shown in the right picture of FIG. 3, each sub-block with 4×4 pixels is transformed/reconstructed when the left, upper and upper right sub-blocks corresponding thereto have been transformed/reconstructed. For example, before transforming/reconstructing the number 3 sub-block, the upper sub-block (numbered '1'), the left sub-block (numbered '2') and the upper right sub-block (numbered '4') with respect to the number 3 sub-block have been transformed/reconstructed already. The other sub-blocks all are transformed/reconstructed in accordance with the same concept.

DCT performed on one sub-block is based on the reconstructed values of the corresponding left sub-block and upper sub-block or even the upper right sub-block. However, in accordance with the optimized sequence shown in the right picture of FIG. 3, the "transformation" scheme (corresponding to the operations of the DCT hardware 202) and "reconstruction" scheme (corresponding to the operations of the DCT hardware 212) for some series of sub-blocks may be performed in parallel.

Figure 4:
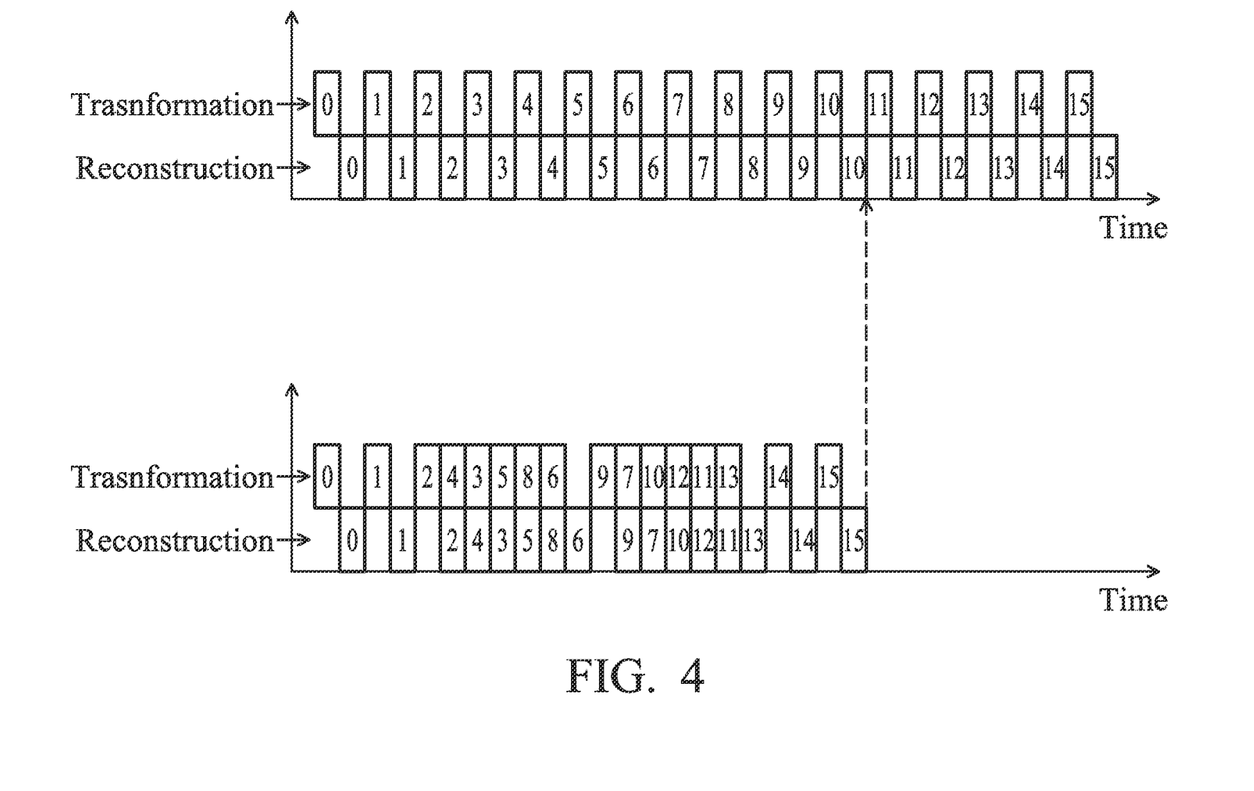
FIG. 4 depicts hardware timing diagrams, the upper timing diagram corresponding to the conventional sequence illustrated in the left picture of FIG. 3 and the lower timing diagram corresponding to the optimized sequence illustrated on the right picture of FIG. 3.

FIG. 4 depicts hardware timing diagrams, the upper timing diagram corresponding to the conventional sequence illustrated in the left picture of FIG. 3 and the lower timing diagram corresponding to the optimized sequence illustrated on the right picture of FIG. 3

According to the conventional sequence shown in the left picture of FIG. 3 for processing the sub-blocks of one macroblock, after the DCT (about the "transformation" scheme) of the number 0 sub-block is finished, the DCT (about the "transformation" scheme) still cannot be performed on the number 1 sub-block until the inverse DCT (about the "reconstruction" scheme) on the number 0 sub-block is finished. The DCT on the number 2 sub-block depends on the reconstruction values of the number 0 and number 1 sub-blocks. Therefore, the DCT (about the "transformation" scheme) on the number 2 sub-block is allowed to be performed after the inverse DCT (about the "reconstruction" scheme) on the number 1 sub-block has been finished. The DCT on the number 3 sub-block depends on the reconstruction values of the number 1 and number 2 sub-blocks. Therefore, the DCT (about the "transformation" scheme) on the number 3 sub-block is allowed to be performed after the inverse DCT (about the "reconstruction" scheme) on the number 2 sub-block has been finished. In this manner, as shown in the upper timing diagram of FIG. 4, the DCT calculations (about the "transformation" scheme) performed on the sub-blocks numbered from 0 to 15 are interlaced with the inverse DCT calculations (about the "reconstruction" scheme) performed on the sub-blocks numbered from 0 to 15.

According to the optimized sequence shown in the right picture of FIG. 3 for processing the sub-blocks of one macroblock, the "transformation" scheme and the "reconstruction" scheme for the macroblock may be at least partially performed in parallel. Referring to the lower timing diagram of FIG. 4, the DCT on the number 4 sub-block may be performed right after finishing the DCT on the number 2 sub-block because of the available reconstruction value of the number 1 sub-block. The DCT on the number 3 sub-block may be performed right after finishing the DCT on the number 4 sub-block because of the available reconstruction value of the number 2 sub-block. Likewise, there are other series of consecutively DCT processed sub-blocks. As shown, the DCT calculations on the number 4, 3, 5, 8, and 6 sub-blocks (about the "transformation" scheme) are performed in parallel with the inverse DCT calculations on the number 2, 4, 3, 5, and 8 sub-blocks (about the "reconstruction" scheme). The DCT calculations on the number 7, 10, 12, 11 and 13 sub-blocks (about the "transformation" scheme) are performed in parallel with the inverse DCT calculations on the number 9, 7, 10, 12 and 11 sub-blocks (about the "reconstruction" scheme). Based on the optimized sequence, the coding speed is increased. As indicated by the arrow, when the hardware using the optimized sequence completes the calculations, the number 11 sub-block is just starting to be processed in the upper timing diagram.

In other exemplary embodiments, there may be some modifications made on the optimized sequence illustrated in the right picture of FIG. 3.

Referring back to FIG. 2, the DCT hardware 202 may perform DCT on residual values D(n) of a transformation advanced sub-block before performing DCT on residual values D(n) of a transformation overtaken sub-block. The transformation advanced sub-block is one of the sub-blocks, numbered from 0 to 15, of a macroblock and the transformation overtaken sub-block is one of the sub-blocks numbered lower than the transformation advanced sub-block within the macroblock. The inverse DCT hardware 212 performs inverse DCT on inverse-quantized transform coefficients (output from 210) of the transformation advanced sub-block before performing inverse DCT on inverse-quantized transform coefficients (output from 210) of the transformation overtaken sub-block. Furthermore, the DCT hardware 202 performs DCT on residual values D(n) of the transformation advanced sub-block and the inverse DCT hardware 212 performs inverse DCT on inverse-quantized transform coefficients (output from 210) of a parallel executed sub-block in parallel. The parallel executed sub-block is one of the sub-blocks numbered lower than the transformation advanced sub-block within the macroblock. Any optimized sequence with the aforementioned concept of the transformation advanced sub-block, transformation overtaken sub-block and parallel executed sub-block may be considered within the scope of the invention.

Another exemplary embodiment of the disclosure is described in this paragraph. The DCT hardware 202 performs DCT on residual values D(n) of the number 4 sub-block before performing DCT on residual values D(n) of a number 3 sub-block, and the inverse DCT hardware 212 performs inverse DCT on inverse-quantized transform coefficients (output from 210) of the number 4 sub-block before performing inverse DCT on inverse-quantized transform coefficients (output from 210) of the number 3 sub-block. The DCT hardware 202 performs DCT on residual values D(n) of the number 4 sub-block and the inverse DCT hardware 212 performs inverse DCT on inverse-quantized transform coefficients (output from 210) of the number 2 sub-block in parallel. The DCT hardware 202 performs DCT on residual values D(n) of the number 3 sub-block and the inverse DCT hardware 212 performs inverse DCT on inverse-quantized transform coefficients (output from 210) of the number 4 sub-block in parallel.

Another exemplary embodiment of the disclosure is described in this paragraph. The DCT hardware 202 performs DCT on residual values D(n) of the number 12 sub-block before performing DCT on residual values D(n) of a number 11 sub-block, and the inverse DCT hardware 212 performs inverse DCT on inverse-quantized transform coefficients (output from 210) of the number 12 sub-block before performing inverse DCT on inverse-quantized transform coefficients (output from 210) of the number 11 sub-block. The DCT hardware 202 performs DCT on residual values D(n) of the number 12 sub-block and the inverse DCT hardware 212 performs inverse DCT on inverse-quantized transform coefficients (output from 210) of the number 10 sub-block in parallel. The DCT hardware 202 performs DCT on residual values D(n) of the number 11 sub-block and the inverse DCT hardware 212 performs inverse DCT on inverse-quantized transform coefficients (output from 210) of the number 12 sub-block in parallel.

Any technique using the aforementioned concept in advanced video coding and decoding is within the scope of the invention. The invention further involves advanced video coding and decoding methods, which are not limited to any specific hardware architecture.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An advanced video coding and decoding chip using H.264 format, comprising:
   discrete cosine transform hardware, performing discrete cosine transform on residual values of a transformation advanced sub-block before performing discrete cosine transform on residual values of a transformation overtaken sub-block, wherein the transformation advanced sub-block is one of sub-blocks, numbered from 0 to 15, of a macroblock and the transformation overtaken sub-block is one of the sub-blocks numbered lower than the transformation advanced sub-block within the macroblock; and
   inverse discrete cosine transform hardware, performing inverse discrete cosine transform on inverse-quantized transform coefficients of the transformation advanced sub-block before performing inverse discrete cosine transform on inverse-quantized transform coefficients of the transformation overtaken sub-block,
   wherein:
   the discrete cosine transform hardware performs discrete cosine transform on residual values of the transformation advanced sub-block and the inverse discrete cosine transform hardware performs inverse discrete cosine transform on inverse-quantized transform coefficients of a parallel executed sub-block in parallel, and the parallel executed sub-block is one of the sub-blocks numbered lower than the transformation advanced sub-block within the macroblock.

2. The advanced video coding and decoding chip as claimed in claim 1, wherein:
   the macroblock contains pixels in rows numbered from 0 to 15 and columns numbered from 0 to 15;
   a sub-block numbered 0 in the macroblock corresponds to pixels in the number 0 to number 3 rows and the number 0 to number 3 columns;
   a sub-block numbered 1 in the macroblock corresponds to pixels in the number 0 to number 3 rows and the number 4 to number 7 columns;
   a sub-block numbered 2 in the macroblock corresponds to pixels in the number 4 to number 7 rows and the number 0 to number 3 columns;
   a sub-block numbered 3 in the macroblock corresponds to pixels in the number 4 to number 7 rows and the number 4 to number 7 columns;

a sub-block numbered 4 in the macroblock corresponds to pixels in the number 0 to number 3 rows and the number 8 to number 11 columns;
a sub-block numbered 5 in the macroblock corresponds to pixels in the number 0 to number 3 rows and the number 12 to number 15 columns;
a sub-block numbered 6 in the macroblock corresponds to pixels in the number 4 to number 7 rows and the number 8 to number 11 columns;
a sub-block numbered 7 in the macroblock corresponds to pixels in the number 4 to number 7 rows and the number 12 to number 15 columns;
a sub-block numbered 8 in the macroblock corresponds to pixels in the number 8 to number 11 rows and the number 0 to number 3 columns;
a sub-block numbered 9 in the macroblock corresponds to pixels in the number 8 to number 11 rows and the number 4 to number 7 columns;
a sub-block numbered 10 in the macroblock corresponds to pixels in the number 12 to number 15 rows and the number 0 to number 3 columns;
a sub-block numbered 11 in the macroblock corresponds to pixels in the number 12 to number 15 rows and the number 4 to number 7 columns;
a sub-block numbered 12 in the macroblock corresponds to pixels in the number 8 to number 11 rows and the number 8 to number 11 columns;
a sub-block numbered 13 in the macroblock corresponds to pixels in the number 8 to number 11 rows and the number 12 to number 15 columns;
a sub-block numbered 14 in the macroblock corresponds to pixels in the number 12 to number 15 rows and the number 8 to number 11 columns; and
a sub-block numbered 15 in the macroblock corresponds to pixels in the number 12 to number 15 rows and the number 12 to number 15 columns.

3. The advanced video coding and decoding chip as claimed in claim 2, wherein:
the discrete cosine transform hardware performs discrete cosine transform on residual values of the number 4 sub-block before performing discrete cosine transform on residual values of the number 3 sub-block;
the inverse discrete cosine transform hardware performs inverse discrete cosine transform on inverse-quantized transform coefficients of the number 4 sub-block before performing inverse discrete cosine transform on inverse-quantized transform coefficients of the number 3 sub-block; and
the discrete cosine transform hardware performs discrete cosine transform on residual values of the number 4 sub-block and the inverse discrete cosine transform hardware performs inverse discrete cosine transform on inverse-quantized transform coefficients of the number 2 sub-block in parallel.

4. The advanced video coding and decoding chip as claimed in claim 3, wherein:
the discrete cosine transform hardware performs discrete cosine transform on residual values of the number 3 sub-block and the inverse discrete cosine transform hardware performs inverse discrete cosine transform on inverse-quantized transform coefficients of the number 4 sub-block in parallel.

5. The advanced video coding and decoding chip as claimed in claim 2, wherein:
the discrete cosine transform hardware performs discrete cosine transform on residual values of the number 12 sub-block before performing discrete cosine transform on residual values of the number 11 sub-block;
the inverse discrete cosine transform hardware performs inverse discrete cosine transform on inverse-quantized transform coefficients of the number 12 sub-block before performing inverse discrete cosine transform on inverse-quantized transform coefficients of the number 11 sub-block; and
the discrete cosine transform hardware performs discrete cosine transform on residual values of the number 12 sub-block and the inverse discrete cosine transform hardware performs inverse discrete cosine transform on inverse-quantized transform coefficients of the number 10 sub-block in parallel.

6. The advanced video coding and decoding chip as claimed in claim 5, wherein:
the discrete cosine transform hardware performs discrete cosine transform on residual values of the number 11 sub-block and the inverse discrete cosine transform hardware performs inverse discrete cosine transform on inverse-quantized transform coefficients of the number 12 sub-block in parallel.

7. The advanced video coding and decoding chip as claimed in claim 2, wherein:
the discrete cosine transform hardware performs discrete cosine transform on residual values of the number 0, the number 1, the number 2, the number 4, the number 3, the number 5, the number 8, the number 6, the number 9, the number 7, the number 10, the number 12, the number 11, the number 13, the number 14 and the number 15 sub-blocks in order; and
the inverse discrete cosine transform hardware performs inverse discrete cosine transform on inverse-quantized transform coefficients of the number 0, the number 1, the number 2, the number 4, the number 3, the number 5, the number 8, the number 6, the number 9, the number 7, the number 10, the number 12, the number 11, the number 13, the number 14 and the number 15 sub-blocks in order.

8. The advanced video coding and decoding chip as claimed in claim 7, wherein:
the discrete cosine transform hardware performs discrete cosine transform on residual values of the number 4 sub-block and the inverse discrete cosine transform hardware performs inverse discrete cosine transform on inverse-quantized transform coefficients of the number 2 sub-block in parallel;
the discrete cosine transform hardware further performs discrete cosine transform on residual values of the number 3 sub-block and the inverse discrete cosine transform hardware performs inverse discrete cosine transform on inverse-quantized transform coefficients of the number 4 sub-block in parallel;
the discrete cosine transform hardware further performs discrete cosine transform on residual values of the number 5 sub-block and the inverse discrete cosine transform hardware performs inverse discrete cosine transform on inverse-quantized transform coefficients of the number 3 sub-block in parallel;
the discrete cosine transform hardware further performs discrete cosine transform on residual values of the number 8 sub-block and the inverse discrete cosine transform hardware performs inverse discrete cosine transform on inverse-quantized transform coefficients of the number 5 sub-block in parallel;
the discrete cosine transform hardware further performs discrete cosine transform on residual values of the number 6 sub-block and the inverse discrete cosine transform hardware performs inverse discrete cosine transform on inverse-quantized transform coefficients of the number 8 sub-block in parallel;

the discrete cosine transform hardware further performs discrete cosine transform on residual values of the number 7 sub-block and the inverse discrete cosine transform hardware performs inverse discrete cosine transform on inverse-quantized transform coefficients of the number 9 sub-block in parallel;

the discrete cosine transform hardware further performs discrete cosine transform on residual values of the number 10 sub-block and the inverse discrete cosine transform hardware performs inverse discrete cosine transform on inverse-quantized transform coefficients of the number 7 sub-block in parallel;

the discrete cosine transform hardware further performs discrete cosine transform on residual values of the number 12 sub-block and the inverse discrete cosine transform hardware performs inverse discrete cosine transform on inverse-quantized transform coefficients of the number 10 sub-block in parallel;

the discrete cosine transform hardware further performs discrete cosine transform on residual values of the number 11 sub-block and the inverse discrete cosine transform hardware performs inverse discrete cosine transform on inverse-quantized transform coefficients of the number 12 sub-block in parallel; and the discrete cosine transform hardware further performs discrete cosine transform on residual values of the number 13 sub-block and the inverse discrete cosine transform hardware performs inverse discrete cosine transform on inverse-quantized transform coefficients of the number 11 sub-block in parallel.

9. A method for advanced video coding and decoding using H.264 format, comprising:

using discrete cosine transform hardware to perform discrete cosine transform on residual values of a transformation advanced sub-block before discrete cosine transform is performed on residual values of a transformation overtaken sub-block, wherein the transformation advanced sub-block is one of sub-blocks, numbered from 0 to 15, of a macroblock and the transformation overtaken sub-block is one of the sub-blocks numbered lower than the transformation advanced sub-block within the macroblock;

using inverse discrete cosine transform hardware to perform inverse discrete cosine transform on inverse-quantized transform coefficients of the transformation advanced sub-block before inverse discrete cosine transform is performed on inverse-quantized transform coefficients of the transformation overtaken sub-block; and using the discrete cosine transform hardware to perform discrete cosine transform on residual values of the transformation advanced sub-block when using the inverse discrete cosine transform hardware to perform inverse discrete cosine transform on inverse-quantized transform coefficients of a parallel executed sub-block, wherein the parallel executed sub-block is one of the sub-blocks numbered lower than the transformation advanced sub-block within the macroblock.

10. The method as claimed in claim 9, wherein:
the macroblock contains pixels in rows numbered from 0 to 15 and columns numbered from 0 to 15;

a sub-block numbered 0 in the macroblock corresponds to pixels in the number 0 to number 3 rows and the number 0 to number 3 columns;

a sub-block numbered 1 in the macroblock corresponds to pixels in the number 0 to number 3 rows and the number 4 to number 7 columns;

a sub-block numbered 2 in the macroblock corresponds to pixels in the number 4 to number 7 rows and the number 0 to number 3 columns;

a sub-block numbered 3 in the macroblock corresponds to pixels in the number 4 to number 7 rows and the number 4 to number 7 columns;

a sub-block numbered 4 in the macroblock corresponds to pixels in the number 0 to number 3 rows and the number 8 to number 11 columns;

a sub-block numbered 5 in the macroblock corresponds to pixels in the number 0 to number 3 rows and the number 12 to number 15 columns;

a sub-block numbered 6 in the macroblock corresponds to pixels in the number 4 to number 7 rows and the number 8 to number 11 columns;

a sub-block numbered 7 in the macroblock corresponds to pixels in the number 4 to number 7 rows and the number 12 to number 15 columns;

a sub-block numbered 8 in the macroblock corresponds to pixels in the number 8 to number 11 rows and the number 0 to number 3 columns;

a sub-block numbered 9 in the macroblock corresponds to pixels in the number 8 to number 11 rows and the number 4 to number 7 columns;

a sub-block numbered 10 in the macroblock corresponds to pixels in the number 12 to number 15 rows and the number 0 to number 3 columns;

a sub-block numbered 11 in the macroblock corresponds to pixels in the number 12 to number 15 rows and the number 4 to number 7 columns;

a sub-block numbered 12 in the macroblock corresponds to pixels in the number 8 to number 11 rows and the number 8 to number 11 columns;

a sub-block numbered 13 in the macroblock corresponds to pixels in the number 8 to number 11 rows and the number 12 to number 15 columns;

a sub-block numbered 14 in the macroblock corresponds to pixels in the number 12 to number 15 rows and the number 8 to number 11 columns; and a sub-block numbered 15 in the macroblock corresponds to pixels in the number 12 to number 15 rows and the number 12 to number 15 columns.

11. The method as claimed in claim 10, comprising:
using the discrete cosine transform hardware to perform discrete cosine transform on residual values of the number 4 sub-block before discrete cosine transform is performed on residual values of the number 3 sub-block;

using the inverse discrete cosine transform hardware performs inverse discrete cosine transform on inverse-quantized transform coefficients of the number 4 sub-block before inverse discrete cosine transform is performed on inverse-quantized transform coefficients of the number 3 sub-block; and using the discrete cosine transform hardware to perform discrete cosine transform on residual values of the number 4 sub-block when using the inverse discrete cosine transform hardware to perform inverse discrete cosine transform on inverse-quantized transform coefficients of the number 2 sub-block.

12. The method as claimed in claim 11, comprising:
using the discrete cosine transform hardware to perform discrete cosine transform on residual values of the number 3 sub-block when using the inverse discrete cosine transform hardware to perform inverse discrete cosine transform on inverse-quantized transform coefficients of the number 4 sub-block.

13. The method as claimed in claim 10, comprising:
using the discrete cosine transform hardware to perform discrete cosine transform on residual values of the number 12 sub-block before discrete cosine transform is performed on residual values of the number 11 sub-block;
using the inverse discrete cosine transform hardware to perform inverse discrete cosine transform on inverse-quantized transform coefficients of the number 12 sub-block before inverse discrete cosine transform is performed on inverse-quantized transform coefficients of the number 11 sub-block; and
using the discrete cosine transform hardware to perform discrete cosine transform on residual values of the number 12 sub-block when using the inverse discrete cosine transform hardware to perform inverse discrete cosine transform on inverse-quantized transform coefficients of the number 10 sub-block.

14. The method as claimed in claim 13, comprising:
using the discrete cosine transform hardware to perform discrete cosine transform on residual values of the number 11 sub-block when using the inverse discrete cosine transform hardware to perform inverse discrete cosine transform on inverse-quantized transform coefficients of the number 12 sub-block.

15. The method as claimed in claim 10, comprising:
using the discrete cosine transform hardware to perform discrete cosine transform on residual values of the number 0, the number 1, the number 2, the number 4, the number 3, the number 5, the number 8, the number 6, the number 9, the number 7, the number 10, the number 12, the number 11, the number 13, the number 14 and the number 15 sub-blocks in order; and
using the inverse discrete cosine transform hardware to perform inverse discrete cosine transform on inverse-quantized transform coefficients of the number 0, the number 1, the number 2, the number 4, the number 3, the number 5, the number 8, the number 4, the number 9, the number 7, the number 10, the number 12, the number 11, the number 13, the number 14 and the number 15 sub-blocks in order.

16. The method as claimed in claim 15, comprising:
using the discrete cosine transform hardware to perform discrete cosine transform on residual values of the number 4 sub-block when using the inverse discrete cosine transform hardware to perform inverse discrete cosine transform on inverse-quantized transform coefficients of the number 2 sub-block;
using the discrete cosine transform hardware to perform discrete cosine transform on residual values of the number 3 sub-block when using the inverse discrete cosine transform hardware to perform inverse discrete cosine transform on inverse-quantized transform coefficients of the number 4 sub-block;
using the discrete cosine transform hardware to perform discrete cosine transform on residual values of the number 5 sub-block when using the inverse discrete cosine transform hardware to perform inverse discrete cosine transform on inverse-quantized transform coefficients of the number 3 sub-block;
using the discrete cosine transform hardware to perform discrete cosine transform on residual values of the number 8 sub-block when using the inverse discrete cosine transform hardware to perform inverse discrete cosine transform on inverse-quantized transform coefficients of the number 5 sub-block;
using the discrete cosine transform hardware to perform discrete cosine transform on residual values of the number 6 sub-block when using the inverse discrete cosine transform hardware to perform inverse discrete cosine transform on inverse-quantized transform coefficients of the number 8 sub-block;
using the discrete cosine transform hardware to perform discrete cosine transform on residual values of the number 7 sub-block when using the inverse discrete cosine transform hardware to perform inverse discrete cosine transform on inverse-quantized transform coefficients of the number 9 sub-block;
using the discrete cosine transform hardware to perform discrete cosine transform on residual values of the number 10 sub-block when using the inverse discrete cosine transform hardware to perform inverse discrete cosine transform on inverse-quantized transform coefficients of the number 7 sub-block;
using the discrete cosine transform hardware to perform discrete cosine transform on residual values of the number 12 sub-block when using the inverse discrete cosine transform hardware to perform inverse discrete cosine transform on inverse-quantized transform coefficients of the number 10 sub-block;
using the discrete cosine transform hardware to perform discrete cosine transform on residual values of the number 11 sub-block when using the inverse discrete cosine transform hardware to perform inverse discrete cosine transform on inverse-quantized transform coefficients of the number 12 sub-block; and
using the discrete cosine transform hardware to perform discrete cosine transform on residual values of the number 13 sub-block when using the inverse discrete cosine transform hardware to perform inverse discrete cosine transform on inverse-quantized transform coefficients of the number 11 sub-block.

* * * * *